United States Patent Office 3,296,263
Patented Jan. 3, 1967

3,296,263
2-ALKYL-4-ALKYLAMINO-6-ALKOXY-s-TRIAZINES
Teruaki Tsujikawa, Otsu, Japan, assignor to Takeda Chemical Industries Ltd., Osaka, Japan
No Drawing. Filed May 4, 1964, Ser. No. 364,827
15 Claims. (Cl. 260—249.5)

This invention relates to novel and useful 2-alkyl-4-alkylamino - 6 - alkoxy - s - triazines, more particularly, to compounds represented by the formula:

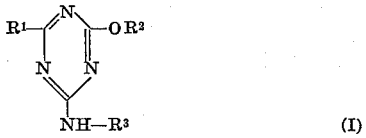

(I)

wherein each $R^1$ and $R^3$ represents a lower alkyl group having up to six carbon atoms and $R^2$ represents a lower alkyl group having up to four carbon atoms.

The lower alkyl groups represented by $R^1$ and $R^3$ may, for example be methyl, ethyl, propyl, isopropyl, butyl or isobutyl.

The lower alkyl represented by $R^2$ may, for example, be methyl, ethyl, propyl or isopropyl.

It was found that said s-triazines of the Formula I have an action to stimulate respiration when administerd into animals, and that they can be used as a novel and excellent respiratory stimulant for setting right the respiratory paralysis caused by surgical operations or traffic accidents in view of their low toxicity to the animals.

The principal object of the present invention is, therefore, to provide novel triazine compounds which are useful as respiratory stimulant. It is another object of this invention to provide a novel method for producing said triazine compounds.

The latter object is realized by the following means; a compound represented by the formula:

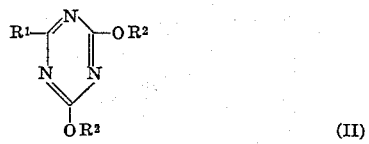

(II)

in which $R^1$ and $R^2$ have the same meaning as in the Formula I, is allowed to react with an alkylamine having the formula $NH_2$—$R^3$, in which $R^3$ has the same meaning as in the Formula I.

The starting materials represented by the Formula II, 2-alkyl-4,6-dialkoxy-s-triazine, are easily prepared by allowing the corresponding 2-alkyl-4,6-dihalo-s-triazine to react with the corresponding alcohol.

The reaction is carried out with or without a solvent. The solvent may, for example, be water, an alcohol such as methanol, ethanol or propanol, an ether such as dioxane or tetrahydrofuran, or a mixture of two or more of these. The reaction may desirably be carried out under elevated pressure if the alkylamine used in the reaction has a low boiling point. Usually the reaction is accomplished by heating the reaction mixture at a temperature of about 70–100° centigrade for several hours. At any rate, in practice the most preferable reaction conditions should of course be selected.

The triazines of the present invention may also be produced by allowing an alcohol having the formula $R^2OH$, wherein $R^2$ has the same meaning as defined above, to react with a compound represented by the formula:

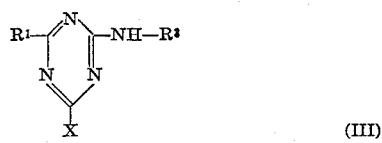

(III)

in which $R^1$ and $R^3$ have the same meaning as defined above and X represents a halogen such as chlorine or bromine.

This reaction is preferably carried out in the presence of a base. The desirable bases are, for example, an alkali metal alkoxide such as sodium methoxide, sodium ethoxide, potassium methoxide, potassium ethoxide, an alkali metal hydroxide such as sodium hydroxide or potassium hydroxide, and an amine such as pyridine, trimethylamine or triethylamine. For carrying out the reaction, the use of a suitable solvent is recommended. The desirable solvent is, for example, an alcohol, acetone, dioxane, benzene or toluene. It is especially desirable to use an excess of alcohol used as a starting material in the reaction. Similarly a base such as pyridine may be employed as a catalyst and also as a solvent. While reaction proceeds at an ambient temperature, it is desirably carried out under heating at a temperature of about 40° to about 160° centigrade for from about ten minutes to several hours, so that the reaction rate may relatively accelerate. Practically, however, it is needless to say that the most preferable reaction conditions should, of course, be selected.

The free triazines represented by the Formula I can form the corresponding acid addition salts with an acid which is exemplified by mineral acids including hydrochloric acid, sulfuric acid, nitric acid and carbonic acid, and organic acids including acetic acid, citric acid, succinic acid, maleic acid, fumaric acid and tartaric acid. These acid addition salts function to solubilize the free triazines in water or to cause them to solidify when obtained in an oily state, which does not deviate from the scope of the present invention.

Moreover, they have also the respiration-stimulating action and the pharmaceutically acceptable salts formed with e.g. the above exemplified acids are used for the same purpose as the free s-triazines.

Phamacology of s-triazines of the present invention is, for example, as follows.

(1) RESPIRATORY STIMULATING ACTION

In the intact cats anesthetized with chloralose or the intact dogs anesthetized with amobarbital sodium, s-triazines of the present invention in the intravenous dose of more than about 10 milligrams per kilogram of the body weight, cause an increase of respiratory rate and depth and the effect lasts for more than about 1 hour on the average. This effect is not interfered with by bilateral vagotomy and/or the denervation of carotid chemoreceptor and causes a marked increase of the frequency of discharge of the phrenic nerves. Moreover, intravertebral injection of s-triazines of the present invention shows a marked respiratory stimulation in a small dose. As the results, it is considered that the mode of action of s-triazines of the present invention is due to their direct effect on the respiratory center.

In the rabbits lightly anesthetized with urethan, s-triazines of the present invention in the intravenous dose of about 5 milligrams per kilogram of the body weight increase the respiratory volume per minute by 37.5% and the effect lasts for about 27 minutes on the average, while similar administration of about 20 milligrams per kilogram of the body weight increases the respiratory volume by 106% and the effect lasts for about 2 hours on the average.

In the rabbits similarly anesthetized with urethan, s-triazines of the present invention antagonize the respiratory depression induced by morphine, dl-3-hydroxy-N-methylmorphinan or pentobarbital sodium.

(2) ACTIONS ON CIRCULATORY SYSTEM

In the cats anesthetized with chloralose or the dogs anesthetized with amobarbital sodium, s-triazines of the present invention in the intravenous dose of about 40 milligrams per kilogram of the body weight produce moderate hypotension of short duration, but do not change the pulse-rate. Moreover, in the same animals, s-triazines of the present invention cause no change in the blood pressure in the dose which produces respiratory stimulation.

(3) ACTIONS ON AUTONOMIC NERVOUS SYSTEM s-Triazines of the present invention antagonize epinephrine or serotonin in the blood pressure of cats or dogs, in the isolated guinea pigs' seminal vesicle and in the isolated rats' uterus.

(4) ACTIONS ON CENTRAL NERVOUS SYSTEM

In mice, s-triazines of the present invention in the intraperitoneal dose of more than about 50 milligrams per kilogram of the body weight cause a sedation and potentiate the narcotic effect of pentobarbital sodium while they give a slight analgetic effect. s-Triazines of the present invention have no effect on the conditioned avoidance response of rats when the intraperitoneal dose is less than about 50 milligrams per kilogram of the body weight. In monkeys s-triazines of the present invention cause a sedation in a dose of more than about 50 milligrams per kilogram of the body weight and catatonie like effect in very large doses.

(5) HYPOTHERMIC AND ANTI-PHLOGISTIC EFFECT

In rats, s-triazines of the present invention show the same hypothermic effect as aminopyrine and inhibit moderately dextran-induced edema.

(6) TOXICITY

Median lethal dose of s-triazines of the present invention by the intraperitoneal injection in mice is about 380 milligrams per kilogram of the body weight. Administration of s-triazines of the present invention in about the lethal dose shows in turn salivation, diarrhoea and heart failure, but no convulsion.

In order to illustrate the present invention, the following examples are given. The present invention will be described in detail as to specific embodiments thereof by way of examples, it being not intended that these details constitute undue limitations upon the scope of the invention. In these examples, temperatures are all in degrees centigrade and uncorrected; percentages are on the weight basis; and abbreviations "g." and "cc." should be read as "gram(s)" and "cubic centimeter(s)," respectively.

Example 1

A mixture of 2-ethyl-4,6-dimethoxy-s-triazine (5 g.), 70% aqueous ethylamine solution (2 cc.) and water (20 cc.) is sealed in a tube and heated at 70° C. for 3 hours. The reaction mixture is extracted with chloroform. The extract is dried with sodium sulfate and concentrated. The residue is crystallized from petroleum ether to obtain 2-ethyl-4-ethylamino-6-methoxy-s-triazine. The triazine compound (2 g.) is dissolved in a mixture of oxalic acid (0.5 g.) and a small amount of methanol by heating. After cooling, separating crystals are collected and recrystallized from methanol to obtain oxalic acid salt of 2-ethyl-4-ethylamino-6-methoxy-s-triazine melting at 84–85° C.

Example 2

A mixture of 2-methyl-4,6-dimethoxy-s-triazine (15.5 g.), 30% aqueous methylamine solution (10.5 cc.) and water (100 cc.) is sealed in a tube and heated at 70° C. for 3 hours. The reaction mixture is extracted with chloroform. The extract is dried with sodium sulfate and concentrated. The residue is crystallized from petroleum ether to obtain 2-methyl-4-methylamino-6-methoxy-s-triazine melting at 155–157° C.

Example 3

A mixture of 2-methyl-4,6-dimethoxy-s-triazine (15.5 g.), 70% aqueous ethylamine solution (6.5 cc.) and water (100 cc.) is sealed in a tube and heated at 70° C. for 2.5 hours. The reaction mixture is concentrated, and the residue is recrytallized from n-hexane to obtain 2-methyl-4-ethylamino-6-methoxy-s-triazine melting at 83–87° C.

Example 4

A mixture of 2-methyl-4,6-diethoxy-s-triazine (18.3 g.), 30% aqueous methylamine solution (10.5 cc.) and water (100 cc.) is sealed in a tube and heated at 70° C. for 3 hours. The reaction mixture is extracted with chloroform. The extract is dried with sodium sulfate and concentrated. The residue is crystallized from petroleum ether to obtain 2-methyl-4-methylamino-6-ethoxy-s-triazine melting at 92–95° C.

Example 5

A mixture of 2 - methyl - 4,6 - diethoxy - s - triazine (18.3 g.), 70% aqueous ethylamine solution (6.5 cc.) and water (50 cc.) is sealed in a tube and heated at 70–80° C. for 3 hours. The reaction mixture is concentrated and the residue is crystallized for ligroin to obtain 2-methyl-4-ethylamino-6-ethoxy-s-triazine melting at 97–99° C.

Example 6

A mixture of 2-ethyl-4,6-dimethoxy-s-triazine (16.9 g.), isopropylamine (5.9 cc.) and water (100 cc.) is heated on a water bath for 4 hours. The reaction mixture is concentrated to dryness and the residue is crystallized from petroleum ether to obtain 2-ethyl-4-isopropylamino-6-methoxy-s-triazine melting at 40–42° C.

Example 7

A mixture of 2-ethyl-4,6-di-n-butoxy-s-triazine (25.3 g.), 30% aqueous methylamine solution (10.5 cc) and water (100 cc.) is sealed in a tube and heated at 80° C. for 3 hours. The reaction mixture is extracted with chloroform and the extract is dried with sodium sulfate. The solvent is evaporated and the residue is recrystallized from petroleum ether to obtain 2-ethyl-4-methylamino-6-n-butoxy-s-triazine melting at 38–39° C.

Example 8

To a solution prepared from metallic sodium (0.37 g.) and methanol (30 cc.) is added 2-methyl-4-methylamino-6-chloro-s-triazine (5 g.). The mixture is refluxed for 3 hours and concentrated to give residue. A small amount of water is added to the residue. The water-insoluble part is collected and crystallized from methanol to obtain 2 - methyl - 4 - methylamino-6-methoxy-s-triazine (1.5 g.) melting at 155–157° C.

Example 9

To a solution prepared from metallic sodium (0.73 g.) and ethanol (30 cc.) is added 2-methyl-4-methylamino-6-chloro-s-triazine (5 g.). The mixture is refluxed for 2 hours and concentrated to give residue. A small amount of water is added to the residue. The water-insoluble part is collected and crystallized from petroleum ether to obtain 2-methyl-4-methylamino-6-ethoxy-s-triazine (1.3 g.) melting at 92–95° C.

*Example 10*

To a solution prepared from metallic sodium (0.67 g.) and ethanol (30 cc.) is added 2-methyl-4-ethylamino-6-chloro-s-triazine (5 g.). The mixture is refluxed for 2 hours and concentrated to give residue. A small amount of water is added to the residue. The water-insoluble part is collected and crystallized from diluted ethanol to obtain 2-methyl-4-ethylamino-6-ethoxy-s-triazine (3.3 g.) melting at 97–99° C.

*Example 11*

To a solution prepared from metallic sodium (0.67 g.) and n-butanol (30 cc.) is added 2-methyl-4-ethylamino-6-chloro-s-triazine (5 g.). The mixture is refluxed for 4 hours and concentrated to give residue. A small amount of water is added to the residue. The water-insoluble part is collected and crystallized from diluted ethanol to obtain 2 - methyl - 4-ethylamino-6-n-butoxy-s-triazine (1.5 g.) melting at 48° C.

*Example 12*

To a solution prepared from metallic sodium (0.46 g.) and methanol (30 cc.) is added 2-ethyl-4-methylamino-6-chloro-s-triazine (3 g.). The mixture is refluxed for 2 hours and concentrated to give residue. A small amount of water is added to the residue to precipitate oily liquid. The oily liquid is extracted with chloroform and the extract is dried and concentrated to give residue. The residue is recrystallized from a mixture of chloroform and petroleum ether to obtain 2 - ethyl - 4 - methylamino - 6-methoxy-s-triazine (2 g.) melting at 95–97° C.

*Example 13*

To a solution prepared from metallic sodium (0.44 g.) and ethanol (30 cc.) is added 2-ethyl-4-methylamino-6-chloro-s-triazine (3 g.). The mixture is refluxed for 3 hours and concentrated to give residue. A small amount of water is added to the residue. The water-insoluble part is collected and crystallized from petroleum ether to obtain 2 - ethyl-4-methylamino-6-ethoxy-s-triazine (2 g.) melting at 77° C.

*Example 14*

To a solution prepared from metallic sodium (0.44 g.) and n-butanol (30 cc.) is added 2-ethyl-4-methylamino-6-chloro-s-triazine (3 g.). The mixture is refluxed for 3.5 hours and concentrated to give residue. A small amount of water is added to the residue to precipitate oily liquid. The oily liquid is extracted with chloroform and the extract is dried and concentrated to give residue. The residue is recrystallized from diluted ethanol to obtain 2-ethyl-4-methylamino-6-n-butoxy-s-triazine (2.5 g.) melting at 38–39° C.

*Example 15*

To a solution prepared from metallic sodium (0.45 g.) and methanol (30 cc.) is added 2-ethyl-4-ethylamino-6-chloro-s-triazine (3 g.). The mixture is refluxed for 2 hours and concentrated to give residue. A small amount of water is added to the residue. The water-insoluble part is collected and crystallized from diluted methanol to obtain 2-ethyl-4-ethylamino-6-methoxy-s-triazine (1.5 g.) melting at 55–58° C.

*Example 16*

To a solution prepared from metallic sodium (0.45 g.) and ethanol (30 cc.) is added 2-ethyl-4-ethylamino-6-chloro-s-triazine (3 g.). The mixture is refluxed for 2 hours and concentrated to give residue. A small amount of water is added to the residue. The water-insoluble part is collected and crystallized from diluted ethanol to obtain 2 - ethyl - 4 - ethylamino-6-ethoxy-s-triazine (2 g.) melting at 55–58° C.

*Example 17*

To a solution prepared from metallic sodium (0.41 g.) and methanol (30 cc.) is added 2-ethyl-4-isopropylamino-6-chloro-s-triazine (3 g.). The mixture is refluxed for 1 hour and concentrated to give residue. A small amount of water is added to the residue. The water-insoluble part is collected and crystallized from diluted methanol to obtain 2-ethyl-4-isopropylamino-6-methoxy-s-triazine (1 g.) melting at 40–42° C.

*Example 18*

To a solution prepared from metallic sodium (0.28 g.) and methanol (30 cc.) is added 2-n-propyl-4-ethylamino-6-chloro-s-triazine (2 g.). The mixture is boiled for 2 hours and concentrated to give residue. A small amount of water is added to the residue. The water-insoluble part is collected and crystallized from diluted methanol to obtain 2 - n - propyl-4-ethylamino-6-methoxy-s-triazine (0.5 g.) melting at 37–40° C.

*Example 19*

To a solution prepared from sodium hydroxide (0.51 g.) and methanol (20 cc.) is added 2-n-propyl-4-methylamino-6-chloro-s-triazine (2 g.). The mixture is boiled for 2 hours and concentrated to give residue. A small amount of water is added to the residue. The water-insoluble part is collected and crystallized from petroleum ether to obtain 2-n-propyl-4-methylamino-6-methoxy-s-triazine (0.9 g.) melting at 44–46° C.

Having thus disclosed the invention, what is claimed is:
1. A compound of the formula:

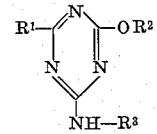

wherein each of $R^1$ and $R^3$ is alkyl of up to six carbon atoms, and $R^2$ is alkyl of up to four carbon atoms.
2. 2-methyl-4-methylamino-6-methoxy-s-triazine.
3. 2-methyl-4-methylamino-6-ethoxy-s-triazine.
4. 2-methyl-4-ethylamino-6-ethoxy-s-triazine.
5. 2-ethyl-4-ethylamino-6-methoxy-s-triazine.
6. 2-ethyl-4-methylamino-6-methoxy-s-triazine.
7. 2-ethyl-4-isopropylamino-6-methoxy-s-triazine.
8. 2-ethyl-4-methylamino-6-ethoxy-s-triazine.
9. 2-ethyl-4-ethylamino-6-ethoxy-s-triazine.
10. 2-ethyl-4-isopropylamino-6-ethoxy-s-triazine.
11. 2-ethyl-4-ethylamino-6-isopropoxy-s-triazine.
12. 2-ethyl-4-methylamino-6-n-butoxy-s-triazine.
13. 2-n-propyl-4-methylamino-6-methoxy-s-triazine.
14. 2-n-propyl-4-ethylamino-6-methoxy-s-triazine.
15. Pharmaceutically acceptable acid addition salts of compounds as claimed in claim 1.

References Cited by the Examiner

UNITED STATES PATENTS 3,097,205  7/1963  Cutler _____ 260—248

FOREIGN PATENTS 579,987  6/1959  Belgium.

WALTER A. MODANCE, *Primary Examiner.*

JOHN M. FORD, *Assistant Examiner.*